(12) United States Patent
Welling

(10) Patent No.: US 10,766,196 B2
(45) Date of Patent: Sep. 8, 2020

(54) FILAMENT FEEDER

(71) Applicant: Ultimaker B.V., Geldermalsen (NL)

(72) Inventor: Kornelis Hermanus Welling, Utrecht (NL)

(73) Assignee: Ultimaker B.V., Utrecht (NL)

( * ) Notice: Subject to any disclaimer, the term of this patent is extended or adjusted under 35 U.S.C. 154(b) by 8 days.

(21) Appl. No.: 16/223,158

(22) Filed: Dec. 18, 2018

(65) Prior Publication Data

US 2019/0193331 A1 Jun. 27, 2019

(30) Foreign Application Priority Data

Dec. 21, 2017 (NL) ...................................... 2020140

(51) Int. Cl.
*B29C 64/321* (2017.01)
*B33Y 30/00* (2015.01)
*B29C 64/118* (2017.01)
*B65H 51/10* (2006.01)

(52) U.S. Cl.
CPC .......... *B29C 64/321* (2017.08); *B29C 64/118* (2017.08); *B33Y 30/00* (2014.12); *B65H 51/10* (2013.01)

(58) Field of Classification Search
CPC ........ B65H 51/10; B65H 59/22; B65H 59/24; B29C 64/321; B29C 64/118; B33Y 30/00
See application file for complete search history.

(56) References Cited

U.S. PATENT DOCUMENTS 6,129,872 A 10/2000 Jang

FOREIGN PATENT DOCUMENTS

WO 2008/100467 A1 8/2008

*Primary Examiner* — William E Dondero
(74) *Attorney, Agent, or Firm* — N.V. Nederlandsch Octrooibureau; Catherine A. Shultz; Katelyn J. Bernier

(57) ABSTRACT

A filament feeder for use in an additive manufacturing system, comprising a main feeder body having mounted thereon a first biasing roller and a driven first gripper roller arranged at an adjustable first roller distance from each other allowing a filament material to be received between the first biasing roller and the first gripper roller. The filament feeder further comprises a second biasing roller and a driven second gripper roller arranged at an adjustable second roller distance from each other for receiving the filament material. A biasing assembly is provided in resilient engagement with the first and second biasing rollers and configured to bias the first and second biasing rollers toward the first and second gripper rollers, respectively, during an additive manufacturing process.

14 Claims, 4 Drawing Sheets

FILAMENT FEEDER

FIELD OF THE INVENTION

The present invention relates to a filament feeder, in particular a filament feeder for use in an additive manufacturing system, wherein the filament feeder allows filament material to be moved through an extruder nozzle during an additive manufacturing process.

BACKGROUND ART

US patent application US 2014/0159273 A1 discloses a filament drive mechanism for use with an additive manufacturing system. The filament drive mechanism comprises first and second drive shafts engaged with each other and configured to rotate in opposing rotational directions around substantially parallel axes that are spaced apart at a fixed offset distance. The first and second drive shafts comprise engagement surfaces substantially aligned with each other for engaging a consumable filament arranged there between. The engagement surfaces are textured surfaces for engagement with the consumable filament, wherein the filament is at least partially compressed at a filament surface at one or more locations concurrently. In a preferred embodiment the engagement surfaces comprise linearly knurled surfaces with a plurality of teeth extending radially around the first and second drive shafts.

US patent application US 2007/0003656 A1 discloses a deposition modelling system that utilizes a drive mechanism to feed a strand of filament to create a model. The drive mechanism comprises a pivot block that is rotatable connected to a fixed block and a motor that rotates a drive shaft. A drive roller is connected to the drive shaft and an idler roller is connected to an idler axle that extends from the pivot block in a substantially perpendicular direction to the direction of rotation of the pivot block with respect to the fixed block and a parallel direction to the drive shaft. The drive roller further includes a channel around its outer circumferential surface that includes a series of teeth to drive the strand of filament.

SUMMARY OF THE INVENTION

The present invention aims to provide a filament feeder for use in an additive manufacturing system comprising one or more extruder nozzles, wherein the filament feeder provides improved handling and motion control of filament material to be moved through an extruder nozzle during an additive manufacturing process.

According to the present invention, a filament feeder for use in an additive manufacturing system is provided comprising a main feeder body having mounted thereon a first roller assembly and a second roller assembly, wherein the first and second roller assemblies are spaced apart along a feed trajectory of the filament feeder. The first roller assembly comprises a first biasing roller and a driven first gripper roller, wherein the first biasing roller and the first gripper roller are journaled for rotation and arranged at an adjustable first roller distance from each other allowing a filament material to be received between the first biasing roller and the first gripper roller. The second roller assembly comprises a second biasing roller and a driven second gripper roller, wherein the second biasing roller and the second gripper roller are journaled for rotation and arranged at an adjustable second roller distance from each other allowing the filament material to be received between the second biasing roller and the driven second gripper roller. Each of the first and second gripper rollers is arranged for driven rotation in a direction corresponding to a feed direction in which the filament material is to be moved along the feed trajectory. The filament feeder further comprises a biasing assembly in resilient engagement with the first and second biasing rollers and configured to bias the first and second biasing rollers toward the first and second gripper rollers, respectively, during an additive manufacturing process.

The filament feeder of the present invention allows filament material to be engaged by each of the first and second roller assemblies through an adjustable biasing or pretension/compression force imposed on each biasing roller. This provides reduced but reliable gripping engagement (i.e. forces) by each of the first and second roller assemblies with the filament material in response to varying thicknesses/diameters of the filament material whilst minimizing deformation, denting, grinding and/or stretching when the filament material is moved.

In a further advantageous embodiment, the main feeder body has mounted thereon a third roller assembly spaced apart from the first and second roller assemblies along the feed trajectory of the filament feeder, wherein the third roller assembly comprises a third biasing roller and a driven third gripper roller, wherein the third biasing roller and the third gripper roller are journaled for rotation and arranged at an adjustable third roller distance from each other, thereby allowing the filament material to be received between the third biasing roller and the third gripper roller. The first, second and third gripper rollers are arranged for rotation corresponding to the feed direction in which the filament material is to be moved along the feed trajectory. The biasing assembly is then in further resilient engagement with the third biasing roller and configured to bias the third biasing roller toward the third gripper roller during an additive manufacturing process.

In this further embodiment the filament material F may be engaged by three roller assemblies and as such individual engagement forces of each roller assembly on the filament material F can be lowered whilst maintaining sufficient pull/push force thereon. This in turn further reduces any deformation, denting, grinding and/or stretching of the filament material F when in contact with the biasing and gripper rollers.

BRIEF DESCRIPTION OF THE DRAWINGS

The present invention will be discussed in more detail below, with reference to the attached drawings, in which FIGS. 1A and 1B each show a three dimensional view of a filament feeder utilizing one sided biasing rollers and gripper rollers according to an embodiment of the present invention.

DETAILED DESCRIPTION OF THE EMBODIMENTS

In an additive manufacturing process, such as fused deposition modelling (FDM), a strand or filament of e.g.

thermoplastic material is forced through a heated extruder nozzle which is arranged and controlled to deposit layers of molten filament on a support bed. Filament material for FDM come in various types exhibiting different characteristics. For example, filaments are often provided on spools in "nominal" strand thicknesses of, for example, 1.75 mm or 3 mm, where the 1.75 mm filament tends to be more popular than the 3 mm filament. Generally, a 1.75 mm filament is easier to use for smaller nozzle diameters (e.g. 0.4 mm) than 3 mm filaments, allowing for precise printing. Filaments of 1.75 mm also provide flow rate flexibility, allowing for faster melting within the extruder nozzle compared to a 3 mm filament. On the other hand, a 3 mm filament allows for higher extrusion rates for increased nozzle diameters (e.g. 1.2 mm) when larger volumes need to be deposited.

Filaments are manufactured within particular manufacturing tolerances and so the outer diameter of a filament may not be constant along its length. Due to such diameter differences/perturbations of a filament, it is important that filament engagement, handling, gripping and motion control during an additive manufacturing process is able to robustly cope which such diameter differences for maintaining required filament feed rates and to guarantee uniform and accurate layer deposition. Another issue of importance for thin filament material is that the filament is prone to damage because of handling, gripping etc. Therefore, handling the filament must be done with care to minimize deformation, denting and/or stretching of the filament as this may negatively impact feeding rate.

From the above observations it can be inferred that there is a need for a filament feeder for use in an additive manufacturing system that is able to reliably feed various types of filament material to an extruder nozzle during an additive manufacturing process. The filament feeder should be capable of handling varying filament thicknesses/diameters as well as diameter/thickness perturbations of a filament along its length as it is forced through an extruder nozzle whilst maintaining required feed rates to ensure uniform and accurate layer deposition.

According to the present invention, an improved filament feeder is provided for an additive manufacturing system that fulfils the above need by allowing robust handling of dimensional variations and inaccuracies of a filament whilst minimizing any damage done to the filament. Various embodiments of such an improved filament feeder according to the present invention are depicted in the figures.

Figure 1A:
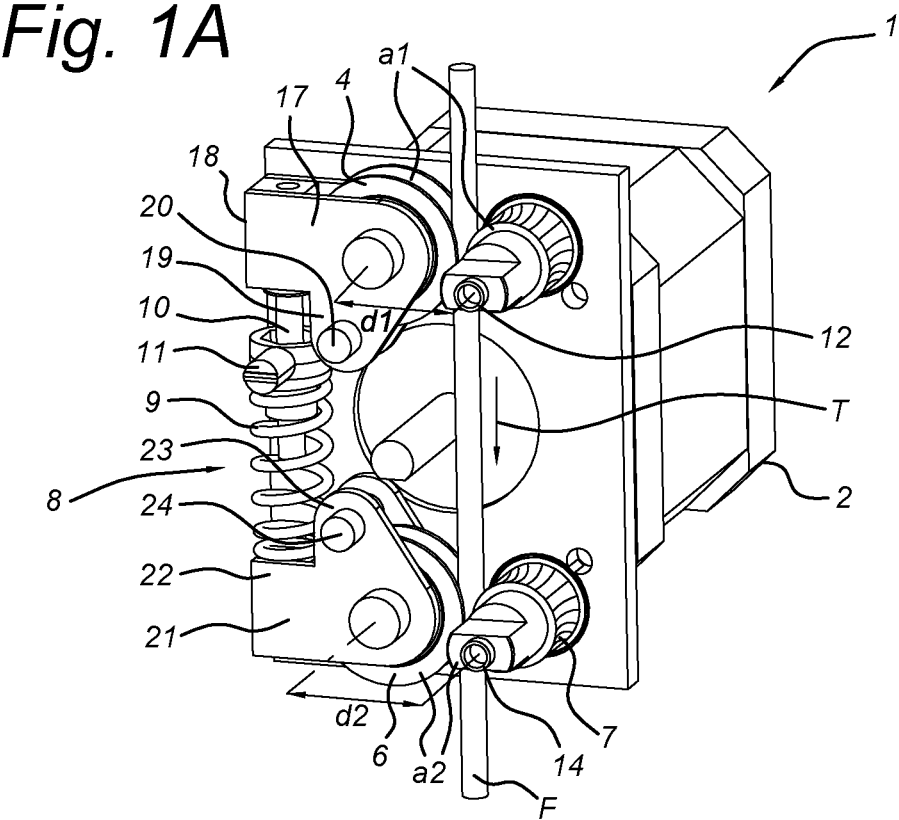

FIG. 1A shows a three dimensional view of a first embodiment of a filament feeder 1 utilizing two rollers assemblies according to an embodiment of the present invention. In the embodiment shown, the feeder assembly 1 of the present invention comprises a main feeder body 2 having mounted thereon a first roller assembly a1 and a second roller assembly a2. As depicted, the first and second roller assemblies a1, a2 are spaced apart along a feed trajectory T of the filament feeder 1. The feed trajectory T defines a path along which a filament material F, i.e. a relatively thin strand of material, is to be moved when the filament feeder 1 is in operation. In the depicted embodiment the feed trajectory T points downward, but without loss of generality it may also point upward.

The first roller assembly a1 comprises a first biasing roller 4 and a driven first gripper roller 5, wherein the first biasing roller 4 and the first gripper roller 5 are journaled for rotation and arranged at an adjustable first roller distance d1 from each other. This allows a filament material F to be received between the first biasing roller 4 and the first gripper roller 5.

Likewise, the second roller assembly a2 comprises a second biasing roller 6 and a driven second gripper roller 7, wherein the second biasing roller 6 and second gripper roller 7 are journaled for rotation and arranged at an adjustable second roller distance d2 from each other allowing the filament material F to be further received between the second biasing roller 6 and the driven second gripper roller 7.

Further, each of the driven first and second gripper rollers 5,7 is arranged for driven rotation in a direction corresponding to a feed direction in which the filament material F is to be moved along the feed trajectory T.

The filament feeder 1 further comprises a biasing assembly 8 in resilient engagement with the first and second biasing rollers 4,6, wherein the biasing assembly 8 is configured to bias the first and second biasing roller 4,6 toward the first and second gripper rollers 5,7, respectively, during an additive manufacturing process. Therefore, during an additive manufacturing process the biasing assembly 8 serves to push the first and second biasing rollers 4, 6 against the filament material F such that, in turn, the filament material F is pushed against the driven first and second gripper rollers 5, 7 that grip and pull/pull the filament F in the desired feed direction.

According to the present invention, both the first and second roller distances d1, d2 are adjustable so that the filament feeder 1 is able to reliably engage and feed a filament F exhibiting dimensional variations, such as a non-constant diameter of a filament F along its length. Furthermore, because the filament feeder 1 comprises two roller assemblies a1, a2 that are spaced apart along the feed trajectory T, forces required to bias, grip and pull/push the filament F by a single roller assembly can be reduced without the gripper rollers slipping (i.e. "grinding") over the filament F. This in turn prevents excessive deformation, denting and/or stretching of the filament F when it is moved through the filament feeder 1.

In a typical embodiment, each of the first and second biasing rollers 4, 6 comprises a relatively smooth circumferential surface for engagement with the filament F, and possibly with a circumferential groove such as a V-shaped groove for improved guidance of the filament F. The first and second biasing rollers 4, 6 of the present invention may be seen as idler rollers that serve to passively rotate to follow and guide the filament F as it is moved through the filament feeder 1.

In another embodiment, the driven first and second gripper rollers 5,7 comprise a textured circumferential surface for engagement with the filament F that serves to grip and pull/push the filament F into the desired feed direction. The driven first and second gripper rollers 4, 6 may also comprise a textured circumferential groove, e.g. a textured V-groove, to facilitate gripping engagement with the filament F.

In an exemplary embodiment, the biasing assembly 8 is in adjustable resilient engagement with the first and second biasing rollers 4, 6, enabling adjustable biasing forces to be imposed by the first and second biasing rollers 4, 6 on the filament F. For example, a particular filament F may be made of a harder or a softer material, thus requiring appropriate biasing forces on the first and second biasing rollers 4, 6 for pushing the filament F against the driven first and second gripper rollers 5, 7 whilst preventing excessive deformation, denting and/or stretching of the filament F. Through such adjustable resilient engagement by the biasing member 8, biasing forces can be specifically adapted to properties of the filament F.

In an exemplary embodiment, the biasing assembly 8 comprises a spring member 9 having an adjustable length, allowing adjustment of the resilient engagement by the biasing assembly 8 through a change in length of the spring member 9. For example, making the spring member 9 longer may be associated with increasing biasing forces between the biasing assembly 8 and the first and second biasing rollers 4, 6. Conversely, making the spring member 9 shorter may be associated with decreasing biasing forces between the biasing assembly 8 and the first and second biasing rollers 4, 6.

In an advantageous embodiment, as shown in FIG. 1A, a single spring member 9 may be provided which simultaneously biases the first and second biasing rollers 4,6. This allows for a biasing force to be imposed on the first biasing roller 4 of substantially the same magnitude as the biasing force imposed on the second biasing roller 6. Both biasing rollers 4, 6 will then contribute equally so that the resilient engagement by the biasing assembly 8 prevents excessive deformation, denting and/or stretching of the filament F at just one of the first or second roller assemblies a1, a2, e.g. at just one of the first or second gripper rollers 5, 7.

In a further exemplary embodiment, the spring member 9, e.g. the single spring member, may be provided with an adjustment member 11 configured for adjusting the length of the spring member 9. In particular, the spring member 9 may be a coil spring and wherein the spring member 9 comprises a rod member 10 that extends through the coil spring. An end portion of the coil spring may then be provided with the adjustment member 11 through which the rod member 10 extends. The adjustment member 11 in turn allows the rod member 10 to be released and slide through the adjustment member 11 toward a position within the coil spring at which the spring member 9 has the desired length. The adjustment member 11 may then be locked to keep the rod member 10 in place.

Figure 1B:
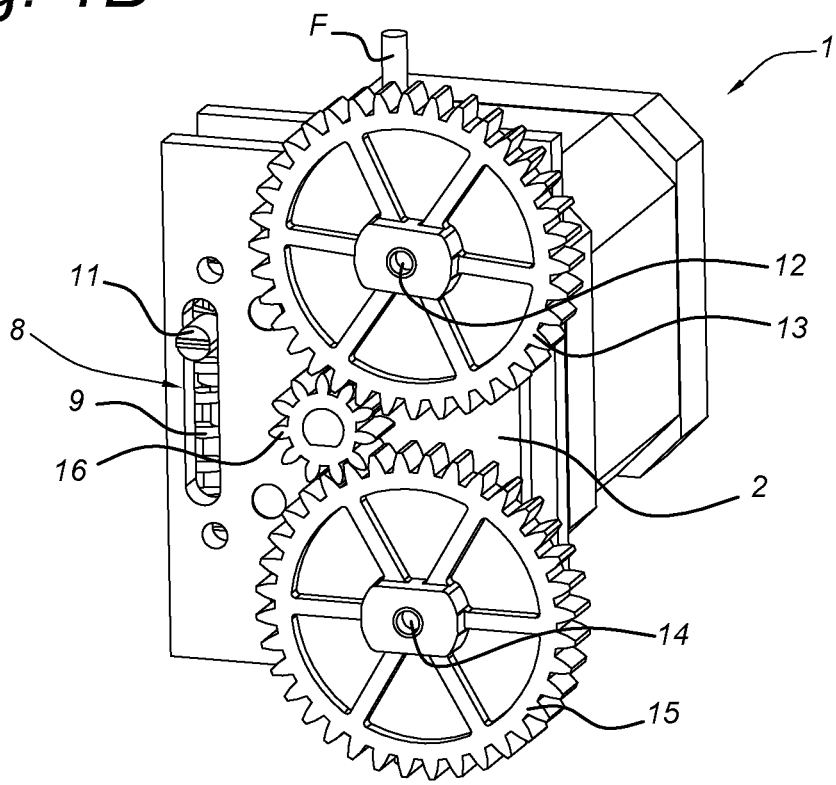

As shown in FIG. 1A, in an embodiment the first and second biasing rollers 4, 6 are arranged along a first side of the feed trajectory T (e.g. on the left). The driven first and second gripper rollers 5, 7 are then arranged along a second side of the feed trajectory T (e.g. on the right), wherein the second side is opposite to the first side. In this embodiment the filament F is engaged by the first and second biasing rollers 4,6 on the same side of the feed trajectory T, allowing for a simplified design for the filament feeder 1 and in particular the biasing assembly 8 to engage the first and second biasing rollers 4, 6. Furthermore, this embodiment circumvents any markers/indentations on a side of the filament F left by the first and second gripper rollers 5, 7. FIG. 1B shows an embodiment of the filament feeder 1 utilizing a geared connection between two roller assemblies according to the present invention. In particular, as outlined for the previously mentioned embodiment wherein the driven first and second gripper rollers 5, 7 may be arranged along the same side of the feed trajectory T, FIG. 1B shows a corresponding embodiment on how each of the first and second gripper rollers 5, 7 may be arranged for driven rotation in a direction corresponding to a feed direction in which the filament material F is to be moved.

As depicted in the embodiment of FIG. 1B, the first gripper roller 5 may comprise a first shaft 12 provided with a first gear 13 and wherein the second gripper roller 7 may comprise a second shaft 14 provided with a second gear 15. The filament feeder 1 may then comprise an intermediate gear 16 rotatably arranged on the main feeder body 2 and wherein the intermediate gear 16 is in meshed engagement with both the first and second gear 13, 15, e.g. wherein the intermediate gear 16 is arranged between the first and second gear 13, 15 for meshed engagement therewith. This embodiment allows one of the gears 13, 15, to be directly driven by, for example, an electric motor while the remaining gears are connected for simultaneously rotation in a direction corresponding to their meshed engagement.

From the embodiment of FIG. 1B it is clearly seen that the first and second gripper rollers 5, 7 are driven in a common/identical direction of rotation, which is needed for the embodiment wherein the first and second griper rollers 5,7 are arranged on the same side of the feed trajectory T as depicted in FIG. 1A. In an embodiment the first and second gears 13, 15 are of equal size (e.g. have the same module), which indicates that the first and second gripper rollers 5, 7 have the same diameter to avoid stretching/compression of the filament F. In a further embodiment, the first and second gears 13, 15 are of unequal size, which indicates that the first and second gripper rollers 5, 7 have different diameters to avoid stretching/compression of the filament F.

As mentioned earlier, the biasing assembly 8 is in resilient engagement with the first and second biasing rollers 4, 6 for biasing these rollers toward the first and second gripper rollers 5, 7, respectively, allowing a filament F to be engaged and moved in reliable fashion even for a varying diameter/thickness of the filament F.

As shown in FIG. 1A, the resilient engagement between the biasing assembly 8 and the first and second biasing rollers 4, 6 can be achieved through various advantageous embodiments. For example, in the depicted embodiment the filament feeder 1 may further comprise a first pivot member 17 having a first end 18 in engagement with the biasing assembly 8 and a second end 19 pivotally connected on the main feeder body 2 at a first pivot point 20, and a second pivot member 21 having a first end 22 in engagement with the biasing assembly 8 and a second end 23 pivotally connected to the main feeder body 2 at a second pivot point 24. The first biasing roller 4 is then journaled for rotation on the first pivot member 17 offset from the first pivot point 20, and wherein the second biasing roller 6 is journaled for rotation on the second pivot member 21 offset from the second pivot point 24. In this embodiment both the first and second pivot member 17, 21 are able to pivot independently from each other, allowing for localised adaptation of the resilient engagement between the biasing assembly 8 and the first and second biasing rollers 4, 6 in response to any diameter differences of the filament F.

In a further embodiment, which is also shown in FIG. 1A, the biasing assembly 8 may be interposed between the first end 18 of the first pivot member 17 and the first end 22 of the second pivot member 21. The biasing assembly 8 is then configured to impose a first biasing force on the first end 18 of the first pivot member 17 and a second biasing force on the first end 22 of the second pivot member 21, wherein the first biasing force is in a direction opposite to a direction of the second biasing force. This embodiment allows for a simple yet effective design of the biasing assembly 8. Through this embodiment, the biasing assembly 8 may serve to impose equal but opposite biasing forces to the first ends 18, 22 of the first and second pivot member 17, 21.

In an exemplary embodiment, the biasing assembly 8 may be a single spring member 9 (e.g. a coil spring), possibly an adjustable spring member 9, and wherein the single spring member 9 is interposed between the first end 18 of the first pivot member 17 and the first end 22 of the second pivot member 21. This allows for an action-reaction type of engagement wherein the single spring member 9 is put into a compressed configuration between the first ends 18, 22 of the first and second pivot members 17, 21. More specifically, the single spring member 9 may be configured to impose the first biasing force on the first end 18 of the first pivot member 17 and the second biasing force on the first end 22 of the second pivot member 21. Consequently, both biasing forces are substantially equal but in opposite direction. Such equal biasing forces ensure that both biasing rollers 4, 6 contribute equally and that the resilient engagement imposed by the biasing assembly 8 is symmetrical to prevent excessive deformation, denting and/or stretching of the filament F at just one of the first or second roller assemblies a1, a2, e.g. at just one of the first or second gripper rollers 5, 7.

Note that the single spring member 9 may be provided with an adjustment member 11 configured for adjusting the length of the spring member 9. In particular, the single spring member 9 may be a coil spring and wherein the spring member 9 comprises a rod member 10 that extends through the coil spring. An end portion of the coil spring may then be provided with the adjustment member 11 through which the rod member 10 extends. The adjustment member 11 in turn allows the rod member 10 to be released and slide through the adjustment member 11 toward a position within the coil spring at which the spring member 9 has the desired length. The adjustment member 11 may then be locked to keep the rod member 10 in place.

Figure 2A:
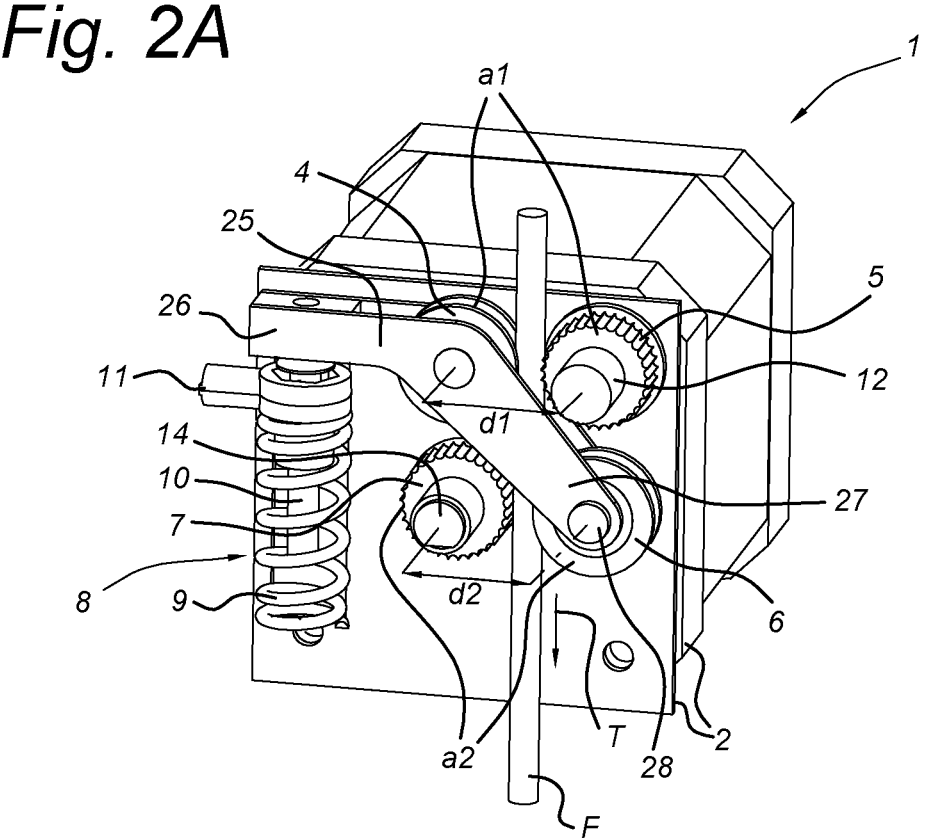
FIGS. 2A and 2B each show a three dimensional view of a filament feeder utilizing a cross wise arrangement of biasing rollers and gripper rollers according to an embodiment of the present invention.

FIG. 2A shows another embodiment of the filament feeder 1 utilizing two roller assemblies according to the present invention. In the depicted embodiment the filament feeder 1 comprises first and second biasing rollers 4, 6 arranged at opposite sides of the feed trajectory T, and wherein the first and second gripper rollers 5, 7 are also arranged at opposite sides of the feed trajectory T. So the first and second biasing rollers 4, 6 and the driven first and second gripper rollers 5, 7 are arranged "crosswise" along the feed trajectory T.

In contrast to the embodiment shown in FIG. 1A, in the embodiment of FIG. 2A the filament F experiences a more balanced pulling/pushing force on both sides of the feed trajectory T from the first and second gripper rollers 5, 7. Here, any indentations in the filament F left by the first and second gripper rollers 5, 7 are distributed more symmetrically. However, the first and second roller assemblies a1, a2 are spaced apart along the feed trajectory T such that forces required to grip and pull/push the filament F by a single roller assembly are reduced, preventing excessive deformation, denting and/or stretching of the filament F.

Figure 2B:
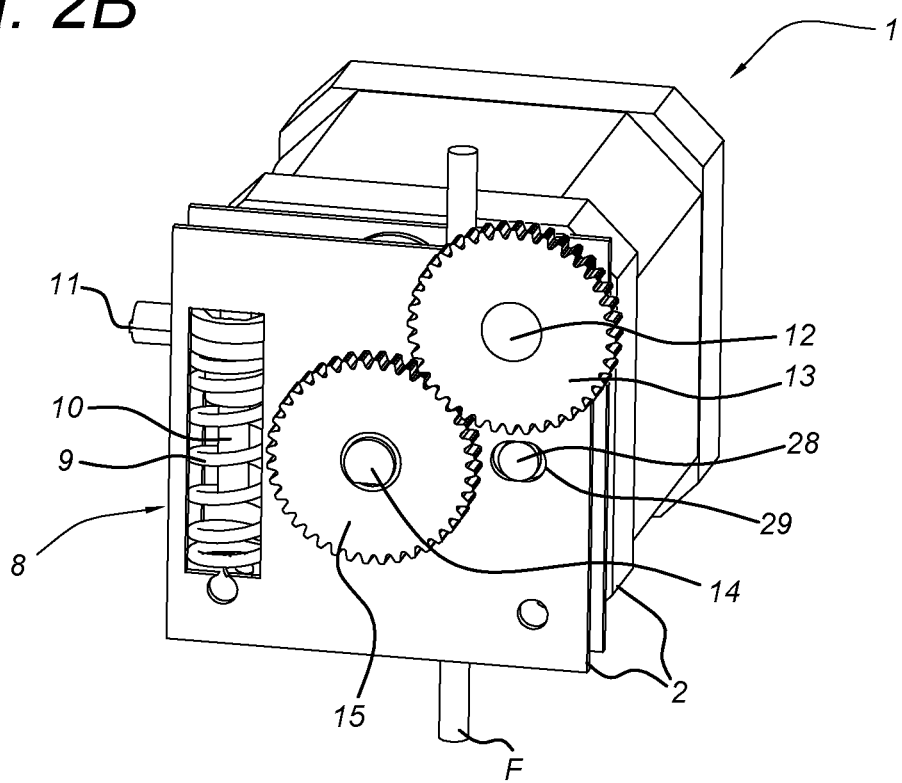

FIG. 2B shows an alternative embodiment of the filament feeder 1 utilizing a geared connection between two roller assemblies according to the present invention. In the embodiment shown, the first gripper roller 5 comprises a first shaft 12 provided with a first gear 13 and wherein the second gripper roller 7 comprises a second shaft 14 provided with a second gear 15, wherein the first and second gear 13, 15 are in direct meshed engagement.

In this embodiment there is no intermediate gear compared to the alternative embodiment shown in FIG. 1A. Due to the meshed engagement between the first and second gear 13, 15, the first and second gripper rollers 5, 7 are connected for driven rotation in opposite directions as required, since the first and second gripper rollers 5, 7 are arranged on opposite sides of the filament trajectory T.

In the embodiment of FIG. 2A, the filament feeder 1 may further comprise a first pivot member 25 that extends across the feed trajectory T and which is pivotally connected to the main feeder body 2, wherein the first pivot member 25 has a first end 26 in engagement with the biasing assembly 8. The first and second biasing rollers 4,6 are then journaled for rotation on the first pivot member 25 on opposite sides of the feed trajectory T. In this embodiment the first and second biasing rollers 4,6 simultaneously engage the filament F through efficient movement of a single pivot member, i.e. the first pivot member 25. Through this embodiment it is possible to impose substantially equal biasing forces by the first and second biasing rollers 4, 6, so that, in turn, the first and second gripper rollers 5, 7 each engage the filament F with substantially equal forces.

In a further embodiment, the first pivot member 25 comprises a second end 27 which is pivotally connected to the main feeder body 2 at a pivot point 28 that coincides with an axis of rotation of the second biasing roller 6, and wherein this axis of rotation, i.e. the pivot point/shaft 28, is linearly movable with respect to the main feeder body 2, particularly with respect to the second gripper roller 7. In this embodiment the second biasing roller 6 is journaled for rotation on the second end 27 of the first pivot member 25 and as such linearly moveable with respect to the main feeder body 2 and thus the second gripper roller 7. Therefore, the pivot point 28 at which the first pivot member 25 is pivotally connected is linearly moveable with respect to the second gripper roller 7 and as a result the second biasing roller 6 is linearly moveable.

This embodiment allows for a convenient connection of the first pivot member 25 to the main feeder body 2 by allowing both rotation and linear motion of the second end 27 of the first pivot member 25. In particular, the resilient engagement of the biasing assembly 8 with the first end 26 of the first pivot member 25, in combination with the rotatable and linearly moveable second end 27 of the first pivot member 25, provides sufficient freedom of movement whereby the first pivot member 25 is able to resiliently an simultaneously bias both the first and second biasing rollers 4, 6 toward the first and second gripper roller 5, 7.

Note that in this embodiment it is likewise possible to impose substantially equal biasing forces by the first and second biasing rollers 4, 6 so that, in turn, the first and second gripper rollers 5, 7 each engage the filament F with substantially equal forces. This is possible due to the second biasing roller 6 being linearly moveable as outlined above and wherein the first pivot member 25 is pivotally arranged at the moveable axis of rotation, i.e. the moveable pivot point/shaft 28 of the second biasing roller 6. Such a mechanical configuration of the first pivot member 25 provides sufficient degrees of freedom (DOF) whereby both the first and second biasing rollers 4, 6 can be biased with substantially equal biasing forces by means of the biasing assembly 8.

As shown in the embodiment of FIG. 2B, the second end 27 of the first pivot member 25, and in particular the pivot point 28, may be slidably arranged with respect to a slot 29 in the main feeder body 2. This allows the second biasing roller 6, for example, to slide toward the second gripper roller 7 when the first pivot member 25 rotates under the influence of a biasing force imposed by the biasing assembly 8. Conversely, the second biasing roller 6 is likewise able to move (e.g. slide) away from the second gripper roller 7 to temporarily follow sudden increases in the diameter/thickness of the filament F.

In the embodiment of FIG. 2A it is further shown that, as mentioned previously, a single spring member 9 (e.g. a coil spring) may be provided to bias both the first and second biasing rollers 4, 6 simultaneously. In the depicted embodiment, the single spring member 9 is connected to the main feeder body 2 at one end whereas its other end is in engagement with the first end 26 of the first pivot member 25. The first pivot member 25 then further ensures that the first and second biasing rollers 4, 6 contribute equally, so that the first and second gripper rollers 5, 7 each engage the filament F with substantially equal forces also to prevent deformation, denting and/or stretching of the filament F at just one of the first or second roller assemblies a1, a2.

Furthermore, the single spring member 9 may be provided with an adjustment member 11 configured for adjusting the length of the single spring member 9. In particular, the single spring member 9 may be a coil spring and wherein the spring member 9 comprises a rod member 10 that extends through the coil spring. An end portion of the coil spring may then be provided with the adjustment member 11 through which the rod member 10 extends. The adjustment member 11 in turn allows the rod member 10 to be released and slide through the adjustment member 11 toward a position within the coil spring at which the spring member 9 has the desired length. The adjustment member 11 may then be locked to keep the rod member 10 in place.

Figure 3A:
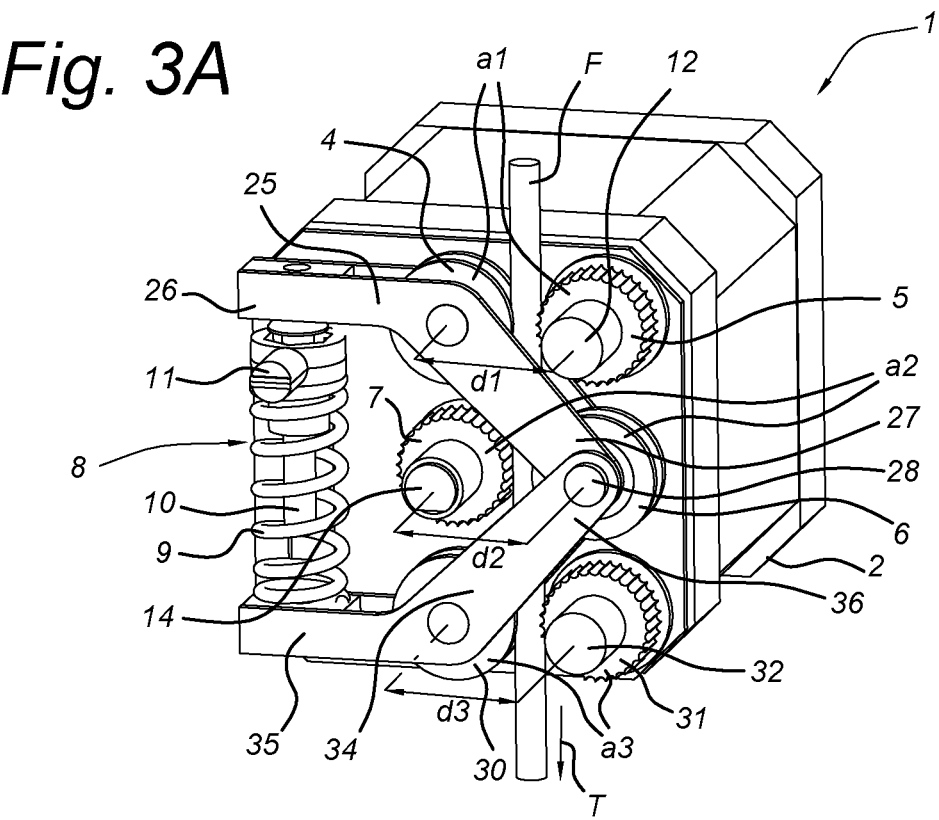
FIGS. 3A and 3B each show a three dimensional view of a filament feeder utilizing an alternative cross wise arrangement of biasing rollers and gripper rollers according to another embodiment of the present invention.

To further improve handling and control of a filament F being fed by the filament feeder 1 during an additive manufacturing process, FIG. 3A shows an embodiment of a filament feeder 1 utilizing three roller assemblies. In the depicted embodiment, the main feeder body 2 has further mounted thereon a third roller assembly a3 spaced apart from the first and second roller assemblies a1, a2 along the feed trajectory T of the filament feeder 1. The third roller assembly a3 comprises a third biasing roller 30 and a driven third gripper roller 31, wherein the third biasing roller 30 and the third gripper roller 31 are journaled for rotation and arranged at an adjustable third roller distance d3 from each other allowing the filament material F to be received between the third biasing roller 30 and the third gripper roller 31.

Further, the first, second and third gripper rollers 5, 7, 31 are arranged for rotation corresponding to the feed direction in which the filament material F is to be moved along the feed trajectory T, wherein the biasing assembly 8 is in further resilient engagement with the third biasing roller 30 and configured to bias the third biasing roller 30 toward the third gripper roller 31, respectively, during an additive manufacturing process.

In this embodiment, a filament F can be fed even more reliably by the filament feeder 1 as forces required to move the filament F are now advantageously divided among three roller assemblies. This allows individual biasing, gripping and pulling/pushing forces imposed by each of the rollers assemblies a1, a2, a3 on the filament F to be further reduced for preventing deformation, denting and/or stretching of the filament F.

In an exemplary embodiment, the third biasing roller 30 may also comprise a relatively smooth circumferential surface for engagement with the filament F, possibly with a circumferential groove, e.g. a V-shaped groove, to facilitate guiding the filament F. As with the other biasing rollers 4, 6, the third biasing roller 30 may be seen as an idler roller that serves to passively rotate and guide the filament F as it is moved through the filament feeder 1. In a further exemplary embodiment, the driven third gripper roller 31 may comprise a textured circumferential surface that serves to grip and move the filament F into the feed direction. The driven third gripper roller 31 may comprise a textured circumferential groove (e.g. V-groove) for further facilitating gripping engagement with the filament F.

In an embodiment as shown in FIG. 3A, the second and third biasing rollers 6, 30 are arranged at opposite sides of the feed trajectory T, and wherein the second and third gripper rollers 7, 31 rollers are likewise arranged at opposite sides of the feed trajectory T. Through this embodiment the filament F experiences alternating biasing-gripping engagement along the feed trajectory T by the first, second and third roller assemblies a1, a2, a3. Such alternating engagement provides balanced pulling/pushing forces across and along the feed trajectory T. Also, any deformations, indentations and/or stretch marks left by the gripper rollers 5, 7, 31 on the filament F are distributed evenly and as such prevent rupture of the filament F when high feed forces are required.

Figure 3B:
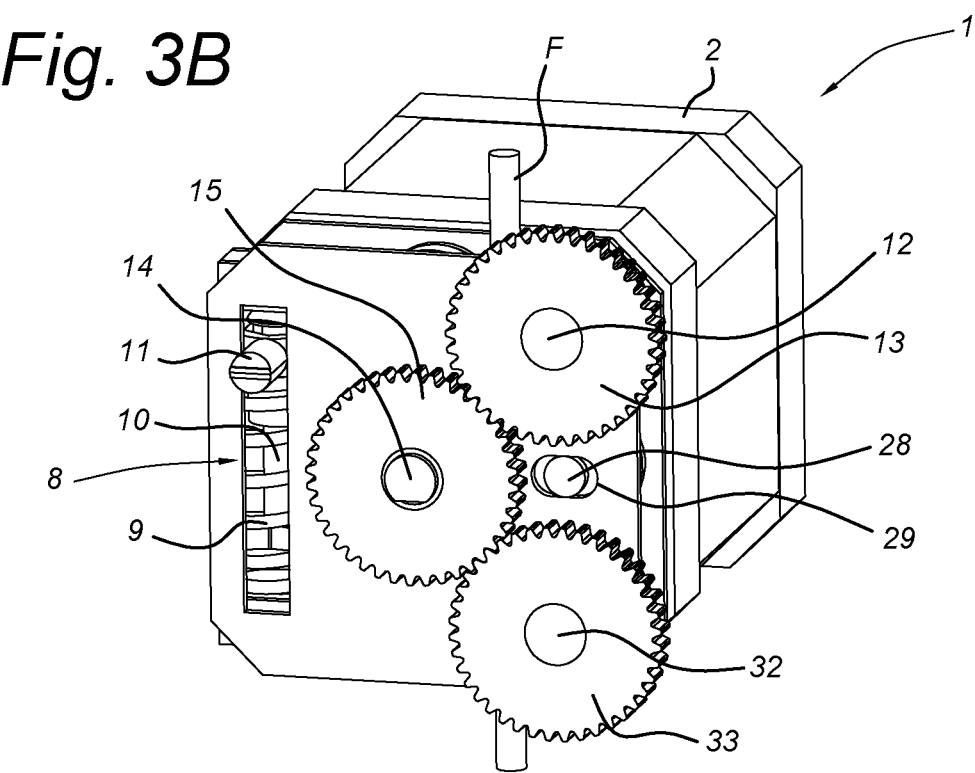

FIG. 3B shows another embodiment of the filament feeder 1 utilizing a geared connection between three roller assemblies according to the present invention. In the depicted embodiment, the first gripper roller 5 comprises a first shaft 12 provided with a first gear 13, and wherein the second gripper roller 7 comprises a second shaft 14 provided with a second gear 15, and wherein the third gripper roller 31 comprises a third shaft 32 provided with a third gear 33, wherein the second gear 15 is in meshed engagement with the first and third gear 13, 33.

Due to the meshed engagement by the second gear 15 with the first and third gear 13, 33, the first, second and third gripper rollers 5, 7, 31 can be efficiently connected for driven rotation in a required feed direction for the filament F. In particular, from the embodiment of FIG. 3B it is clearly seen that the first and third gripper rollers 5, 31 are driven in a common/identical direction of rotation, but wherein the second gripper roller 7 is driven in opposite direction to the direction of the first and third gripper rollers 5, 31. This particular rotational pattern of the gripper rollers 5, 7, 31 is made possible as the second gear 15 acts as an intermediate gear as used, for example, in the embodiment shown in FIG. 1A, thus allowing the first and third gripper rollers 5, 31 to rotate in the same direction whilst the second gripper roller 7 is driven to rotate in an opposite direction. In an exemplary embodiment, the filament feeder 1 comprises an electric motor connected to the first, second or third gear 13, 15, 33 to simultaneously provide driven rotation to all gripper rollers 5, 7, 31 in the appropriate direction.

In an embodiment the first, second and third gears 13, 15, 33 are of equal size (e.g. have the same module), which would indicate that the first, second and third gripper rollers 5, 7, 31 have the same diameter to avoid stretching/compression of the filament F. In a further embodiment, the first, second and third gears 13, 15, 33 may be of unequal size, which would allow the first, second and third gripper rollers 5, 7, 31 to have different diameters to avoid stretching/compression of the filament F along the feed trajectory T.

As depicted in FIG. 3A, the filament feeder 1 may further comprise a second pivot member 34 extending across the feed trajectory T, wherein the second pivot member 34 has a first end 35 in engagement with the biasing assembly 8 and a second end 36 pivotally connected to the first pivot member 25 at the second biasing roller 6. The second and third biasing rollers 6, 30 are journaled for rotation on the second pivot member 34 on opposite sides of the feed trajectory T, and wherein the second pivot member 34 is pivotally connected to the first pivot member 25 at the second biasing roller 6. In this embodiment all biasing rollers 4, 6, 30 can be simultaneously moved for engagement with the filament F in effective and accurate fashion by displacement of the first and second pivot members 25, 34.

Note that the embodiment of FIG. 3A provides an advantageous and surprisingly effective extension of the embodiment shown FIG. 2A, wherein the first and second roller assemblies a1, a2 are augmented with the third roller assembly a3, and wherein the first pivot member 25 is augmented with a second pivot member 34, which is pivotally connected to the first pivot member 25 at the second biasing roller 6, e.g. at an axis of rotation/shaft thereof. Like the embodiment of FIG. 2A, in FIG. 3A it is shown that the first pivot member 25 may comprise a second end 27 which is pivotally connected to the main feeder body 2 at a pivot point 28 that coincides with an axis of rotation/shaft 28 of the second biasing roller 6, and wherein the pivot point 28 is linearly movable with respect to the main feeder body 2.

In this embodiment the second biasing roller 6 may be journaled for rotation at a common point, i.e. the pivot point 28, of both the second end 27 of the first pivot member 25 as well as the second end 36 of the second pivot member 34. So the pivot point 28 at which the first pivot member 25 and second pivot member 34 are pivotally connected to the main feeder body 2 may be linearly moveable with respect to the main feeder body 2 and thus the second gripper roller 7.

As shown in the embodiment of FIG. 3B, the shared pivot point 28 of the second end 27 of the first pivot member 25 and the second end 36 of the second pivot member 34 may be slidably arranged with respect to a slot 29 in the main feeder body 2. This allows the second biasing roller 6 to slide toward or away from the second gripper roller 7 when the first and second pivot members 25, 34 rotate under the influence of diameter/thickness changes of the filament F.

Note that in the embodiments of FIG. 3A, 3B the biasing forces of the first and third biasing rollers 4, 30 are substantially equal whilst a biasing force imposed by the second biasing roller 6 will be substantially equal to the combined forces of the first and third biasing rollers 4, 30. That is, a biasing force of the second biasing roller 6 will be substantially twice the force imposed by the first or third biasing rollers 4, 30.

Returning to FIG. 3A, in a further embodiment the biasing assembly 8 may be interposed between the first end 26 of the first pivot member 25 and the first end 35 of the second pivot member 34, wherein the biasing assembly 8 is configured to impose a first biasing force on the first end 26 of the first pivot member 25 and a second biasing force on the first end 35 of the second pivot member 34, wherein the first biasing force is in a direction opposite to a direction of the second biasing force. This embodiment allows for simultaneous yet reliable and efficient biasing of the first, second and third biasing rollers 4, 6, 30. Moreover, through this embodiment, the biasing assembly 8 is capable of imposing substantially equal but opposite biasing forces to the first ends 26, 35 of the first and second pivot members 25, 34.

As depicted, in an embodiment the biasing assembly 8 may be a single spring member 9 (e.g. a coil spring), possibly an adjustable spring member 9, and wherein the single spring member 9 is interposed between the first end 26 of the first pivot member 25 and the first end 35 of the second pivot member 34. As mentioned previously, this allows for an action-reaction type of engagement wherein the single spring member 9 is put into a compressed configuration between the first ends 26, 35 of the first and second pivot members 25, 34. More specifically, the single spring member 9 may be configured to impose the first biasing force on the first end 26 of the first pivot member 25 and the second biasing force on the first end 35 of the second pivot member 34. Consequently, both biasing forces are substantially equal but in opposite direction. Such equal biasing forces ensure that through the first and second pivot members 25, 34, the first and third biasing rollers 4, 30 contribute substantially equally, whereas the second biasing roller 6 contributes substantially twice the force imposed by the first or third biasing rollers 4, 30.

Because there are three roller assemblies a1, a2, a3, all biasing forces can be reduced for maintaining sufficient grip to prevent excessive deformation, denting and/or stretching of the filament F at the first, second or third roller assemblies a1, a2, a3, e.g. at the first, second or third gripper rollers 5, 7, 31.

As with the embodiments shown in e.g. FIGS. 1A and 2A, the single spring member 9 may be provided with an adjustment member 11 configured for adjusting the length of the single spring member 9. The single spring member 9 may be a coil spring and wherein the spring member 9 comprises a rod member 10 that extends through the coil spring. An end portion of the coil spring may then be provided with the adjustment member 11 through which the rod member 10 extends. The adjustment member 11 in turn allows the rod member 10 to be released and slide through the adjustment member 11 toward a position within the coil spring at which the spring member 9 has the desired length. The adjustment member 11 may then be locked to keep the rod member 10 in place.

Figure 4A:
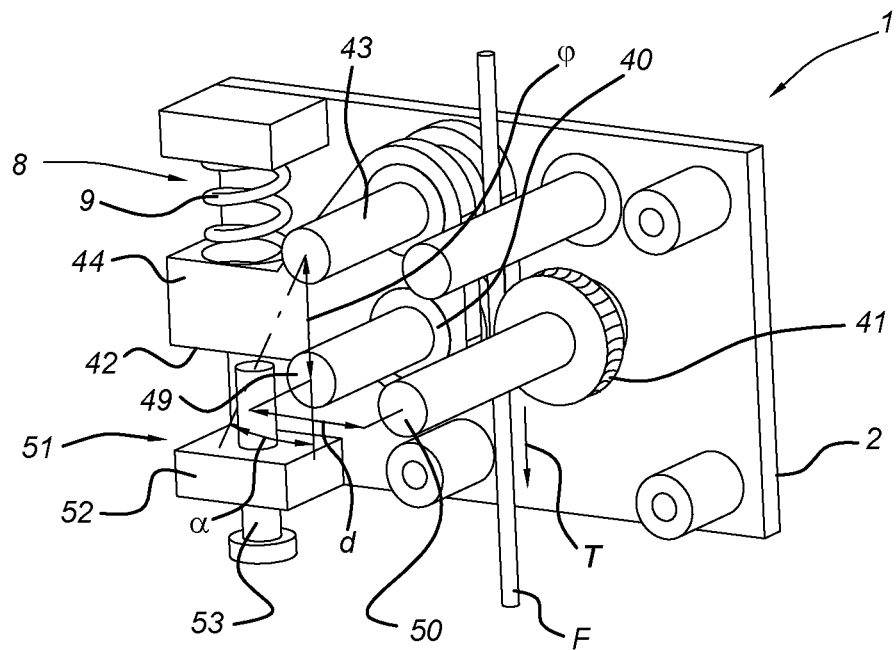
FIGS. 4A and 4B each show a three dimensional view of a filament feeder utilizing a pair of adjustable gripper rollers according to an embodiment of the present invention.
Figure 4B:
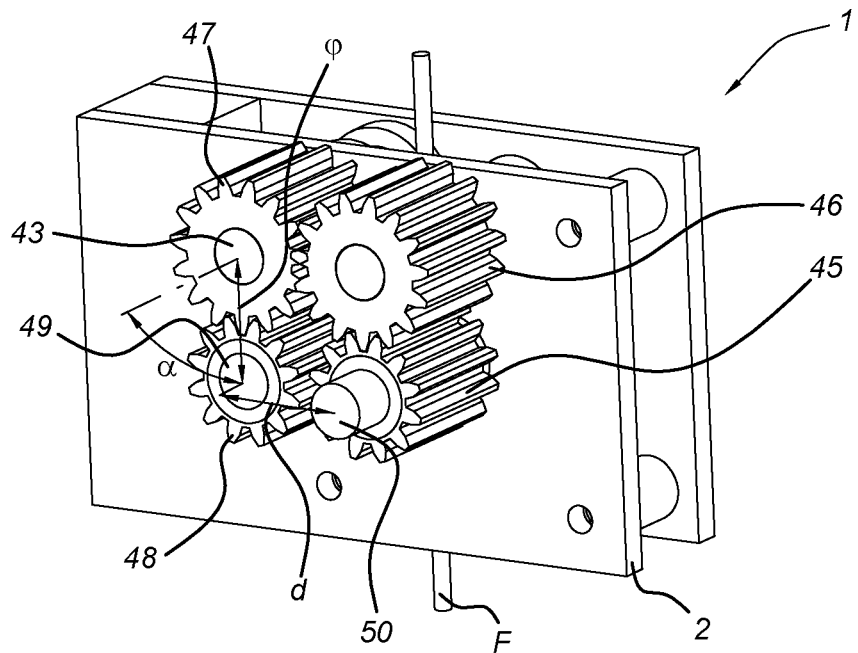

FIGS. 4A and 4B each show an alternative embodiment of a feeder assembly 1 according to the present invention, wherein the feeder assembly 1 provides robust handling of dimensional variations of a filament F whilst minimizing any damage done to the filament as it is fed to an extruder nozzle during an additive manufacturing process.

In the embodiment of FIG. 4A a filament feeder 1 is depicted for use in an additive manufacturing system, wherein the filament feeder 1 comprises a main feeder body 2 provided with a driven first gripper roller 40 and a driven second gripper roller 41 that are journaled for rotation and arranged at an adjustable roller distance d from each other allowing a filament material F to be received between the first and second gripper rollers 40, 41. In a typical embodiment, the first and second gripper rollers 40, 41 each comprise a textured circumferential surface for improving gripping engagement between the filament F and the first and second gripper rollers 40, 41. The textured circumferential surface of each of the driven first and second gripper rollers 40, 41 may further comprise a circumferential groove, for example a V-groove, to further improve gripping engagement with the filament F.

The first and second gripper rollers 40, 41 are connected for rotation in opposite directions corresponding to a feed direction in which the filament material F is to be moved along the feed trajectory T.

The filament feeder 1 further comprises a biasing assembly 8 in resilient engagement with the driven first gripper roller 40 and wherein the biasing assembly 8 is configured to bias the first gripper roller 40 toward the second gripper roller 40.

According to the present invitation, the first and second gripper rollers 40, 41 are arranged at an adjustable roller distance d from each other, and by virtue of the biasing assembly 8 being in resilient engagement with the first gripper roller 40, a filament F can be engaged in adjustable fashion in response to a variable diameter/thickness of the filament material F. As a result, dimensional variations and/or inaccuracies of the filament F can be dealt with robustly to maintain reliable feed rates and to prevent grinding of the filament F by the gripper rollers 40, 41.

In an embodiment, the filament feeder 1 comprises a pivot member 42 pivotally connected to the main feeder body 2 at a pivot point 43, e.g. a pivot shaft 43, wherein the driven first gripper roller 40 is journaled for rotation on the pivot member 42 offset from the pivot point 43, and wherein the biasing assembly 8 is in resilient engagement with the pivot member 42. This embodiment enables the first gripper roller 40 to pivot about the pivot point 43 for resiliently adjusting the roller distance d between the first and second gripper rollers 40, 41 in response to a varying thickness of the filament F.

In an exemplary embodiment, an axis of rotation of the first gripper roller 40, e.g. a shaft 49 thereof, is offset from the pivot point 43 at a constant pivot offset distance φ for allowing the roller distance d to be adjustable. In a further exemplary embodiment, the pivot member 42 may comprise a first end 44 in engagement with the biasing assembly 8.

Like all previous embodiments of the filament feeder 1, in the embodiment of FIG. 4A the biasing assembly 8 may comprise a spring member 9 providing the resilient engagement. So here, the spring member 9 of the biasing assembly 9 resiliently engages the first end 44 of the pivot member 42. In further embodiments the spring member 9 may be adjustable, by e.g. adjusting its length, to adjust biasing forces when required.

According to the present invention, the first gripper roller 40 is a driven and remains so over the adjustable roller distance d. That is, the driven first gripper roller 40 and the driven second gripper roller 41 remain driven in opposite directions even when the roller distance d changes between them. This is advantageous as the filament feeder 1 is then able to provide reliable gripping engagement with the filament F when its diameter/thickness changes during an additive manufacturing process.

As seen from FIG. 4A, through pivot motion of the pivot member 42 over some angular displacement α, the first gripper roller 40 moves along a curved path in correspondence to the angular displacement α when the thickness of the filament F changes.

FIG. 4B shows an embodiment of the filament feeder 1 utilizing a geared connection between the two driven gripper rollers 40, 41 allowing the roller distance d between the two gripper rollers 40, 41 to be adjustable. As depicted, the filament feeder 1 may comprise a first gear 45 connected to the second gripper roller 41 and a second gear 48 connected to the first gripper roller 40. The filament feeder 1 may further comprise a first intermediate gear 46 rotationally arranged on the main feeder body 2 in meshed engagement with the first gear 45, and a second intermediate gear 47 rotationally arranged on the pivot point 43, e.g. on the pivot shaft 43, in meshed engagement with the second gear 48, wherein the first and second intermediate gears 46, 47 are in meshed engagement with each other. From FIG. 4B it is seen that through this gear arrangement the driven first and second gripper rollers 40, 41 are indeed connected for driven rotation in opposite direction yet allow the first gripper roller 40 to move toward and away from the second gripper roller 41.

Note that the second gear 48 is affixed to an axis of rotation 49, e.g. a shaft 49, of the first gripper roller 40. Likewise, the first gear 45 is affixed on an axis of rotation 50, e.g. a shaft 50, of the second gripper roller 41. So the first gear 45 serves to drive the second gripper roller 41 and the second gear 48 serves to drive the first gripper roller 40.

When either the first or second intermediate gears 46, 47 or the first gear 45 is driven, then the second gear 48 remains driven under angular displacement α of the pivot member 42. That is, because the pivot offset distance φ remains constant, the second gear 48 and second intermediate gear 47 remain at a constant distance from each other allowing for meshed engagement when the pivot member 42 rotates over an angular displacement α. And because the second gear 48 is attached to the first gripper roller 40, the second gear 48 and the first gripper roller 40 are able to move in unison over the same angular displacement α of the pivot member 42 along a curved path in response to a varying thickness/diameter of the filament F.

In an embodiment, an electric motor may be mounted on the main feeder body 2 and connected to either the first or second intermediate gears 46, 47 or the first gear 45. This allows the second gear 48 to remain driven yet pivotally arranged about the pivot point 43, so that the first gripper roller 40 is able to adjust the roller distance d between the first and second gripper rollers 40, 41.

In an exemplary embodiment an electric motor may be mounted on the main feeder body 2 and connected to the first gear 45, thereby driving the second gripper roller 41. The first gear 45 then drives the first intermediate gear 46, subsequently the second intermediate great 47, and finally the second gear 48 and thus the first gripper roller 40. From FIG. 4A it is thus seen that the first and second gripper rollers 40, 41 are conveniently and efficiently connected for driven rotation in opposite direction and able to move away or toward each other in response to diameter variations of the filament F.

With reference to FIG. 4A, in an advantageous embodiment the filament feeder 1 may further comprise a blocking unit 51 configured to prevent the pivot member 42 exceeding a predetermined angular displacement α. For example, the blocking unit 51 as depicted may be arranged on the main feeder body 2 and configured to impose a minimum roller distance d between the first and second gripper rollers 40, 41, thus imposing a predetermined minimum angular displacement α. Such a minimum roller distance d prevents excessive deformation or denting of the filament F for a given diameter/thickness. The blocking unit 51 may be particularly advantageous for relatively soft filament materials, such as wax filament material, thermoplastic polyurethane (TPU) filament material, even though the biasing assembly 8 of the filament feeder 1 would be able to impose relatively high biasing forces suitable for harder/tougher filament materials. Therefore, the blocking unit 51 may be further configured to maintain biasing forces on pivot member 42 within predetermined bounds such that the filament material F is prevented from being excessively deformed/dented by the first and second gripper rollers 40, 41.

In an embodiment, the blocking unit 51 may be an adjustable blocking unit configured to prevent the pivot member 42 exceeding an adjustable predetermined angular displacement α. In this embodiment the blocking unit 51 can be adjusted based on particular filament specifications, such as filament diameter/thickness and/or material hardness/softness etc. So for a given filament F, the blocking unit 51 may be adjusted to impose a desired minimum roller distance d, i.e. an adjustable minimum angular displacement α, suitable for the filament F currently in use.

In an exemplary embodiment the adjustable blocking unit 51 comprises a blocking member 53 movably arranged with respect to the main feeder body 2, wherein the blocking member 53 serves to adjust an angular blocking position of the pivot member 42, thereby allowing the minimum roller distance d to be adjusted for a given filament F. In a specific embodiment the blocking member 53 is in threaded engagement with a threaded portion 52 of the main feeder body 2, allowing the blocking member 53 to be moved toward or away from e.g. the first end 44 of the pivot member 42. In this embodiment the blocking member 53 may be seen as a bolt in threaded engagement with a cooperating threaded portion 52 of the main feeder body 2.

From the above detailed description, the present invention can now be summarized by the following embodiments:

Embodiment 1

A filament feeder for use in an additive manufacturing system, comprising a main feeder body (2) having mounted thereon a first roller assembly (a1) and a second roller assembly (a2), the first and second roller assemblies (a1, a2) being spaced apart along a feed trajectory (T) of the filament feeder (1), wherein the first roller assembly (a1) comprises a first biasing roller (4) and a driven first gripper roller (5), the first biasing roller (4) and the first gripper roller (5) being journaled for rotation and arranged at an adjustable first roller distance (d1) from each other allowing a filament material (F) to be received between the first biasing roller (4) and the driven first gripper roller (5), wherein the second roller assembly (a2) comprises a second biasing roller (6) and a driven second gripper roller (7), the second biasing roller (6) and second gripper roller (7) being journaled for rotation and arranged at an adjustable second roller distance (d2) from each other allowing the filament material (F) to be received between the second biasing roller (6) and the driven second gripper roller (7), wherein each of the first and second gripper rollers (5, 7) is arranged for driven rotation in a direction corresponding to a feed direction in which the filament material (F) is to be moved along the feed trajectory (T), and further comprising a biasing assembly (8) in resilient engagement with the first and second biasing rollers (4,6) and configured to bias the first and second biasing roller (4,6) toward the first and second gripper rollers (5,7), respectively, during an additive manufacturing process.

Embodiment 2

The filament feeder according to embodiment 1, wherein the biasing assembly 8 is in adjustable resilient engagement with the first and second biasing rollers (4, 6).

Embodiment 3

The filament feeder according to embodiment 1 or 2, wherein the first and second biasing rollers (4, 6) are arranged at opposite sides of the feed trajectory (T), and wherein the first and second gripper rollers (5, 7) are arranged at opposite sides of the feed trajectory (T).

Embodiment 4

The filament feeder according to any one of embodiments 1-3, wherein the first gripper roller (5) comprises a first shaft (12) provided with a first gear (13) and wherein the second gripper roller (7) comprises a second shaft (14) provided with a second gear (15), wherein the first and second gear (13, 15) are in meshed engagement.

Embodiment 5

The filament feeder according to embodiment 1 or 2, wherein the first and second biasing rollers (4, 6) are arranged along a first side of the feed trajectory (T), and wherein the first and second gripper rollers (5, 7) are arranged along a second side of the feed trajectory (T), the second side being opposite to the first side.

Embodiment 6

The filament feeder according to embodiment 1, 2 or 5, wherein the first gripper roller (5) comprises a first shaft (12) provided with a first gear (13) and wherein the second gripper roller (7) comprises a second shaft (14) provided with a second gear (15), wherein the filament feeder (1) further comprises an intermediate gear (16) rotationally arranged on the main feeder body (2) and wherein the intermediate gear (16) is in meshed engagement with the first and second gear (13, 15).

Embodiment 7

The filament feeder according to embodiment 1, 2, 5 or 6, further comprising a first pivot member (17) having a first end (18) in engagement with the biasing assembly (8) and a second end (19) pivotally connected on the main feeder body (2) at a first pivot point (20), and a second pivot member (21) having a first end (22) in engagement with the biasing assembly (8) and a second end (23) pivotally connected to the main feeder body (2) at a second pivot point (24), wherein the first biasing roller (4) is journaled for rotation on the first pivot member (17) offset from the first pivot point (20), and wherein the second biasing roller (6) is journaled for rotation on the second pivot member (21) offset from the second pivot point (24).

Embodiment 8

The filament feeder according to any one of embodiments 1-4, further comprising a first pivot member (25) extending across the feed trajectory (T) and being pivotally connected to the main feeder body (2), wherein the first pivot member (25) has a first end (26) in engagement with the biasing assembly (8) and wherein the first and second biasing rollers (4,6) are journaled for rotation on the first pivot member (25) on opposite sides the feed trajectory (T).

Embodiment 9

The filament feeder according to embodiment 8, wherein the main feeder body (2) has mounted thereon a third roller assembly (a3) spaced apart from the first and second roller assemblies (a1, a2) along the feed trajectory (T) of the filament feeder (1), wherein the third roller assembly (a3) comprises a third biasing roller (30) and a driven third gripper roller (31), the third biasing roller (30) and the third gripper roller (31) being journaled for rotation and arranged at an adjustable third roller distance (d3) from each other allowing the filament material (F) to be received between the third biasing roller (30) and the third gripper roller (31), wherein the first, second and third gripper rollers (5, 7, 31) are arranged for driven rotation corresponding to the feed direction in which the filament material (F) is to be moved along the feed trajectory (T), and wherein the biasing assembly (8) is in further resilient engagement with the third biasing roller (30) and configured to bias the third biasing roller (30) toward the third gripper roller (31) during an additive manufacturing process.

Embodiment 10

The filament feeder according to embodiment 9, wherein the second and third biasing rollers (6, 30) are arranged at opposite sides of the feed trajectory (T), and wherein the second and third gripper rollers (7,31) are arranged at opposite sides of the feed trajectory (T).

Embodiment 11

The filament feeder according to embodiment 9 or 10, wherein the first gripper roller (5) comprises a first shaft (12) provided with a first gear (13), wherein the second gripper roller (7) comprises a second shaft (14) provided with a second gear (15), and wherein the third gripper roller (31) comprises a third shaft (32) provided with a third gear (33), wherein the second gear (15) is in meshed engagement with the first gear (13) and the third gear (33).

Embodiment 12

The filament feeder according to any one of embodiments 9-11, further comprising a second pivot member (34) extending across the feed trajectory (T), wherein the second pivot member (34) has a first end (35) in engagement with the biasing assembly (8), and wherein the second and third biasing rollers (6, 30) are journaled for rotation on the second pivot member (34) on opposite sides of the feed trajectory (T), and wherein the second pivot member (34) is pivotally connected to the first pivot member (25) at the second biasing roller (6).

Embodiment 13

The filament feeder according to embodiment 7 or 12, wherein the biasing assembly (8) is interposed between the first end (18, 26) of the first pivot member (17, 25) and the first end (22, 35) of the second pivot member (21, 34), wherein the biasing assembly (8) is configured to impose a first biasing force on the first end (18, 26) of the first pivot member (17, 25) and a second biasing force on the first end (22, 35) of the second pivot member (21, 34), wherein the first biasing force is in a direction opposite to a direction of the second biasing force.

Embodiment 14

The filament feeder according to embodiment 8, 12 or 13, wherein the first pivot member (25) comprises a second end (27) which is pivotally connected to the main feeder body (2) at a pivot point (28) that coincides with an axis of rotation of the second biasing roller (6), and wherein the pivot point (28) is linearly movable with respect to the main feeder body (2).

Embodiment 15

The filament feeder according to any one of embodiments 1-14, wherein the biasing assembly (8) comprises a spring member (9) having an adjustable length.

Embodiment 16

A filament feeder for use in an additive manufacturing system, comprises a main feeder body (2) provided with a driven first gripper roller (40) and a driven second gripper roller (41) that are journaled for rotation and arranged at an adjustable roller distance (d) from each other allowing a filament material (F) to be received between the first and second gripper rollers (40, 41), wherein the first and second gripper rollers (40, 41) are connected for driven rotation in opposite direction corresponding to a feed direction in which the filament material (F) is to be moved along a feed trajectory (T), and further comprising a biasing assembly (8) in resilient engagement with the first gripper roller (40) and configured to bias the first gripper roller (40) toward the second gripper roller (41) during an additive manufacturing process.

Embodiment 17

The filament feeder according to embodiment 16, further comprising a pivot member (42) pivotally connected to the main feeder body (2) at a pivot point (43), wherein the driven first gripper roller (40) is journaled for rotation on the pivot member (42) offset from the pivot point (43) and wherein the biasing assembly (8) is in resilient engagement with the pivot member (42).

Embodiment 18

The filament feeder according to embodiment 17, further comprising a first gear (45) connected to the second gripper roller (41) and a second gear (48) connected to the first gripper roller (40), and a first intermediate gear (46) rotationally arranged on the main feeder body (2) in meshed engagement with the first gear (45) and a second intermediate gear (47) rotationally arranged on the pivot point (43) in meshed engagement with the second gear (48), and wherein the first and second intermediate gears (46, 47) are in meshed engagement with each other.

The invention claimed is:

1. A filament feeder for use in an additive manufacturing system, comprising a main feeder body having mounted thereon a first roller assembly and a second roller assembly, the first and second roller assemblies being spaced apart along a feed trajectory of the filament feeder,
  wherein the first roller assembly comprises a first biasing roller and a driven first gripper roller, the first biasing roller and the first gripper roller being journaled for rotation and arranged at an adjustable first roller distance from each other allowing a filament material to be received between the first biasing roller and the driven first gripper roller,
  wherein the second roller assembly comprises a second biasing roller and a driven second gripper roller, the second biasing roller and second gripper roller being journaled for rotation and arranged at an adjustable second roller distance from each other allowing the filament material to be received between the second biasing roller and the driven second gripper roller,
  wherein each of the first and second gripper rollers is arranged for driven rotation in a direction corresponding to a feed direction in which the filament material is to be moved along the feed trajectory, and further comprising
    a single spring member having an adjustable length, the spring member being in resilient engagement with the first and second biasing rollers and configured to bias the first and second biasing roller toward the first and second gripper rollers, respectively, during an additive manufacturing process.

2. The filament feeder according to claim 1, wherein the spring member is in adjustable resilient engagement with the first and second biasing rollers.

3. The filament feeder according to claim 1, wherein the first and second biasing rollers are arranged at opposite sides of the feed trajectory, and wherein the first and second gripper rollers are arranged at opposite sides of the feed trajectory.

4. The filament feeder according to claim 1, wherein the first gripper roller comprises a first shaft provided with a first gear and wherein the second gripper roller comprises a second shaft provided with a second gear, wherein the first and second gear are in meshed engagement.

5. The filament feeder according to claim 1, wherein the first and second biasing rollers are arranged along a first side of the feed trajectory, and wherein the first and second gripper rollers are arranged along a second side of the feed trajectory, the second side being opposite to the first side.

6. The filament feeder according to claim 1, wherein the first gripper roller comprises a first shaft provided with a first gear and wherein the second gripper roller comprises a second shaft provided with a second gear,
wherein the filament feeder further comprises an intermediate gear rotationally arranged on the main feeder body and wherein the intermediate gear is in meshed engagement with the first and second gear.

7. The filament feeder according to claim 1, further comprising
a first pivot member having a first end in engagement with the spring member and a second end pivotally connected on the main feeder body at a first pivot point, and
a second pivot member having a first end in engagement with the spring member and a second end pivotally connected to the main feeder body at a second pivot point,
wherein the first biasing roller is journaled for rotation on the first pivot member offset from the first pivot point, and wherein the second biasing roller is journaled for rotation on the second pivot member offset from the second pivot point.

8. The filament feeder according to claim 7, wherein the spring member is interposed between the first end of the first pivot member and the first end of the second pivot member, wherein the spring member is configured to impose a first biasing force on the first end of the first pivot member and a second biasing force on the first end of the second pivot member, wherein the first biasing force is in a direction opposite to a direction of the second biasing force.

9. The filament feeder according to claim 1, further comprising a first pivot member extending across the feed trajectory and being pivotally connected to the main feeder body, wherein the first pivot member has a first end in engagement with the spring member and wherein the first and second biasing rollers are journaled for rotation on the first pivot member on opposite sides the feed trajectory.

10. The filament feeder according to claim 9, wherein the main feeder body has mounted thereon a third roller assembly spaced apart from the first and second roller assemblies along the feed trajectory of the filament feeder, wherein the third roller assembly comprises a third biasing roller and a driven third gripper roller, the third biasing roller and the third gripper roller being journaled for rotation and arranged at an adjustable third roller distance from each other allowing the filament material to be received between the third biasing roller and the third gripper roller,
wherein the first, second and third gripper rollers are arranged for driven rotation corresponding to the feed direction in which the filament material is to be moved along the feed trajectory, and wherein the spring member is in further resilient engagement with the third biasing roller and configured to bias the third biasing roller toward the third gripper roller during an additive manufacturing process.

11. The filament feeder according to claim 10, wherein the second and third biasing rollers are arranged at opposite sides of the feed trajectory, and wherein the second and third gripper rollers are arranged at opposite sides of the feed trajectory.

12. The filament feeder according to claim 10, wherein the first gripper roller comprises a first shaft provided with a first gear, wherein the second gripper roller comprises a second shaft provided with a second gear, and wherein the third gripper roller comprises a third shaft provided with a third gear, wherein the second gear is in meshed engagement with the first gear and the third gear.

13. The filament feeder according to claim 10, further comprising a second pivot member extending across the feed trajectory, wherein the second pivot member has a first end in engagement with the spring member, and wherein the second and third biasing rollers are journaled for rotation on the second pivot member on opposite sides of the feed trajectory, and wherein the second pivot member is pivotally connected to the first pivot member at the second biasing roller.

14. The filament feeder according to claim 9, wherein the first pivot member comprises a second end which is pivotally connected to the main feeder body at a pivot point that coincides with an axis of rotation of the second biasing roller, and wherein the pivot point is linearly movable with respect to the main feeder body.

* * * * *